United States Patent
Colburn et al.

(10) Patent No.: US 11,640,040 B2
(45) Date of Patent: May 2, 2023

(54) SIMULTANEOUS FOCAL LENGTH CONTROL AND ACHROMATIC COMPUTATIONAL IMAGING WITH QUARTIC METASURFACES

(71) Applicant: University of Washington, Seattle, WA (US)

(72) Inventors: Shane Colburn, Seattle, WA (US); Arka Majumdar, Seattle, WA (US)

(73) Assignee: University of Washington, Seattle, WA (US)

( * ) Notice: Subject to any disclaimer, the term of this patent is extended or adjusted under 35 U.S.C. 154(b) by 165 days.

(21) Appl. No.: 17/157,729

(22) Filed: Jan. 25, 2021

(65) Prior Publication Data
US 2021/0231909 A1    Jul. 29, 2021

Related U.S. Application Data

(60) Provisional application No. 62/966,471, filed on Jan. 27, 2020.

(51) Int. Cl.
| | | |
|---|---|---|
| *G02B 7/10* | (2021.01) | |
| *G02B 21/08* | (2006.01) | |
| *G02B 3/00* | (2006.01) | |
| *G02B 1/00* | (2006.01) | |

(52) U.S. Cl.
CPC ............... *G02B 7/10* (2013.01); *G02B 1/002* (2013.01); *G02B 3/0081* (2013.01); *G02B 21/08* (2013.01)

(58) Field of Classification Search
CPC ........ G02B 7/10; G02B 1/02; G02B 23/0081; G02B 21/08
USPC .......................................................... 359/676
See application file for complete search history.

(56) References Cited

U.S. PATENT DOCUMENTS

| | | |
|---|---|---|
| 3,305,294 A | 2/1967 | Alvarez |
| 8,159,753 B2 | 4/2012 | Ojeda Castaneda |
| 11,385,450 B2 * | 7/2022 | Kwon ............... G02B 21/0092 |
| 2017/0146806 A1 | 5/2017 | Lin |
| 2018/0216797 A1 | 8/2018 | Khorasaninejad |

(Continued)

FOREIGN PATENT DOCUMENTS

| | | |
|---|---|---|
| CN | 109799611 A | 5/2019 |
| TW | 201929248 A | 7/2019 |
| WO | 2020068844 A1 | 4/2020 |

OTHER PUBLICATIONS

Aiello, Maxwell D., et al. "Achromatic varifocal metalens for the visible spectrum." ACS Photonics 6.10 (2019): 2432-2440.

(Continued)

*Primary Examiner* — Marin Pichler
*Assistant Examiner* — Mitchell T Oestreich
(74) *Attorney, Agent, or Firm* — Christensen O'Connor Johnson Kindness PLLC

(57) ABSTRACT

Systems and methods for simultaneous focal length control and achromatic computational imaging with quartic metasurfaces are disclosed herein. In one embodiment, an imaging system includes: a first metalens having a plurality of first nanoposts carried by a first substrate; a second metalens having a plurality of second nanoposts carried by a second substrate; and a source of light configured to emit light toward the first metalens and the second metalens. The first metalens is transversely offset with respect to the second metalens.

20 Claims, 13 Drawing Sheets
(8 of 13 Drawing Sheet(s) Filed in Color)

(56) References Cited

U.S. PATENT DOCUMENTS

| | | |
|---|---|---|
| 2019/0025464 A1 | 1/2019 | Czaplewski |
| 2020/0225386 A1 | 7/2020 | Tsai |
| 2021/0356754 A1* | 11/2021 | Li .................... G02B 27/4211 |

OTHER PUBLICATIONS

Aieta, Francesco, et al. "Aberration-free ultrathin flat lenses and axicons at telecom wavelengths based on plasmonic metasurfaces." Nano letters 12.9 (2012): 4932-4936.

Arbabi, Amir, et al. "Efficient dielectric metasurface collimating lenses for mid-infrared quantum cascade lasers." Optics express 23.26 (2015): 33310-33317.

Arbabi, Ehsan, et al. "Controlling the sign of chromatic dispersion in diffractive optics with dielectric metasurfaces." Optica 4.6 (2017): 625-632.

Arbabi, Amir, et al. "Dielectric metasurfaces for complete control of phase and polarization with subwavelength spatial resolution and high transmission." Nature nanotechnology 10.11 (2015): 937-943.

Arbabi, Ehsan, et al. "MEMS-tunable dielectric metasurface lens." Nature communications 9.1 (2018): 1-9.

Arbabi, Amir, et al. "Subwavelength-thick lenses with high numerical apertures and large efficiency based on high-contrast transmitarrays." Nature communications 6.1 (2015): 1-6.

Astilean, Simion, et al. "High-efficiency subwavelength diffractive element patterned in a high-refractive-index material for 633 nm." Optics letters 23.7 (1998): 552-554.

Avayu, Ori, et al. "Composite functional metasurfaces for multispectral achromatic optics." Nature communications 8.1 (2017): 1-7.

Balli, Fatih, et al. "A hybrid achromatic metalens." Nature communications 11.1 (2020): 1-8.

Ojeda-Castañeda, Jorge, José Enrique A. Landgrave, and Cristina M. Gómez-Sarabia. "Conjugate phase plate use in analysis of the frequency response of imaging systems designed for extended depth of field." Applied optics 47.22 (2008): E99-E105.

Ojeda-Castañeda, Jorge, and Cristina M. Gómez-Sarabia. "Tuning field depth at high resolution by pupil engineering." Advances in Optics and Photonics 7.4 (2015): 814-880.

Cathey, W. Thomas, and Edward R. Dowski. "New paradigm for imaging systems." Applied optics 41.29 (2002): 6080-6092.

Chen, Wei Ting, et al. "A broadband achromatic metalens for focusing and imaging in the visible." Nature nanotechnology 13.3 (2018): 220-226.

Chen, Wei Ting, et al. "A broadband achromatic polarization-insensitive metalens consisting of anisotropic nanostructures." Nature communications 10.1 (2019): 1-7.

Chen, Wei Ting, et al. "Broadband achromatic metasurface-refractive optics." Nano letters 18.12 (2018): 7801-7808.

Chong, Katie E., et al. "Polarization-independent silicon metadevices for efficient optical wavefront control." Nano letters 15.8 (2015): 5369-5374.

Colburn, Shane, Alan Zhan, and Arka Majumdar. "Varifocal zoom imaging with large area focal length adjustable metalenses" Optica 5.7 (2018): 825-831.

Colburn, Shane, et al. "Broadband transparent and CMOS-compatible flat optics with silicon nitride metasurfaces." Optical Materials Express 8.8 (2018): 2330 2344.

Colburn, Shane A., Alan Zhan, and Arka Majumdar. "Focal length adjustable metalenses for zoom imaging." Proc. SPIE vol. 10928, High Contrast Metastructures VIII, 109280E (Mar. 4, 2019).

Colburn, Shane, Alan Zhan, and Arka Majumdar. "Large Area Tunable Alvarez Metalens via Stepper Photolithography." 2018 Conference on Lasers and Electro-Optics (CLEO). IEEE, 2018.

Colburn, Shane, Alan Zhan, and Arka Majumdar. "Metasurface optics for full-color computational imaging." Science advances 4.2 (2018): eaar2114.

Colburn, Shane, and Arka Majumdar. "Simultaneous achromatic and varifocal imaging with quartic metasurfaces in the visible." ACS Photonics 7 (2020): 120-127.

Dowski, Edward R., and W. Thomas Cathey. "Extended depth of field through wave-front coding." Applied optics 34.11 (1995): 1859-1866.

Ee, Ho-Seok, and Ritesh Agarwal. "Tunable metasurface and flat optical zoom lens on a stretchable substrate." Nano letters 16.4 (2016): 2818-2823.

Fan, Zhi-Bin, et al. "Silicon nitride metalenses for close-to-one numerical aperture and wide-angle visible imaging." Physical Review Applied 10.1 (2018): 014005.

Fattal, David, et al. "Flat dielectric grating reflectors with focusing abilities." Nature Photonics 4.7 (2010): 466-470.

Fearing, Ronald S. "Survey of sticking effects for micro parts handling." Proceedings 1995 IEEE, pp. 212-217, vol. 2 (1995).

Foi, Alessandro. "Practical denoising of clipped or overexposed noisy images." 2008 16th European Signal Processing Conference. IEEE, 2008.

Getreuer, Pascal. "Total variation deconvolution using split Bregman." Image Processing on Line 2 (2012): 158-174.

Gutruf, Philipp, et al. "Mechanically tunable dielectric resonator metasurfaces at visible frequencies." Acs nano 10.1 (2016): 133-141.

Han, Zheyi, et al. "MEMS-actuated metasurface Alvarez lens." Microsystems & Nanoengineering 6.1 (2020): 1-11.

Heide, Felix, et al. "Flexisp: A flexible camera image processing framework." ACM Transactions on Graphics (ToG) 33.6 (2014): 1-13.

Heide, Felix, et al. "High-quality computational imaging through simple lenses." ACM Transactions on Graphics (TOG) 32.5 (2013): 1-14.

Huang, Luocheng, et al. "Design and Analysis of Extended Depth of Focus Metalenses for Achromatic." (2020).

Jahani, Saman, and Zubin Jacob. "All-dielectric metamaterials." Nature nanotechnology 11.1 (2016): 23-36.

Kamali, Seyedeh Mahsa, et al. "Highly tunable elastic dielectric metasurface lenses." Laser & Photonics Reviews 10.6 (2016): 1002-1008.

Kamali, Seyedeh Mahsa, et al. "Decoupling optical function and geometrical form using conformal flexible dielectric metasurfaces." Nature communications 7.1 (2016): 1-7.

Kanwal, Saima, et al. "Polarization Insensitive, Broadband, Near Diffraction-Limited Metalens in Ultraviolet Region." Nanomaterials 10.8 (2020): 1439.

Khorasaninejad, Mohammadreza, et al. "Achromatic metalens over 60 nm bandwidth in the visible and metalens with reverse chromatic dispersion." Nano letters 17.3 (2017): 1819-1824.

Khorasaninejad, Mohammadreza, et al. "Metalenses at visible wavelengths: Diffraction-limited focusing and subwavelength resolution imaging." Science 352.6290 (2016): 1190-1194.

Kildishev, Alexander V., Alexandra Boltasseva, and Vladimir M. Shalaev. "Planar photonics with metasurfaces." Science 339. 1232009 (2013).

Klemm, Annett B., et al. "Experimental high numerical aperture focusing with high contrast gratings." Optics letters 38.17 (2013): 3410-3413.

Lalanne, Philippe, et al. "Blazed binary subwavelength gratings with efficiencies larger than those of conventional échelette gratings." Optics letters 23.14 (1998): 1081-1083.

Li, Guixin, et al. "Spin-enabled plasmonic metasurfaces for manipulating orbital angular momentum of light." Nano letters 13.9 (2013): 4148-4151.

Lin, Dianmin, et al. "Dielectric gradient metasurface optical elements." science 345.6194 (2014): 298-302.

Lio, Giuseppe Emanuele, et al. "Hyper Resolute Ultra thin Low Cost All-Dielectric Broadband Achromatic Metalenses." arXiv preprint arXiv:2008.03250 (2020).

Lu, Fanglu. "Planar high-numerical-aperture low-loss focusing reflectors and lenses using subwavelength high contrast gratings." Optics express 18.12 (2010): 12606-12614.

Mait, Joseph N., Gary W. Euliss, and Ravindra A. Athale. "Computational imaging." Advances in Optics and Photonics 10.2 (2018): 409-483.

Osnabrugge, Gerwin, et al. "Generalized optical memory effect." Optica 4.8 (2017): 886-892.

(56) References Cited

OTHER PUBLICATIONS

Park, Joon-Suh, et al. "All-glass, large metalens at visible wavelength using deep-ultraviolet projection lithography." Nano letters 19.12 (2019): 8673-8682.

Schuler, Christian J., et al. "Non-stationary correction of optical aberrations." 2011 International Conference on Computer Vision. IEEE, 2011.

Shalaev, Mikhail I., et al. "High-efficiency all-dielectric metasurfaces for ultracompact beam manipulation in transmission mode." (2015).

She, Alan, et al. "Adaptive metalenses with simultaneous electrical control of focal length, astigmatism, and shift." Science advances 4.2 (2018): eaap9957.

Shen, Zhe, et al. "Numerical study on the tight focusing of radially polarized beams with polarization-insensitive metalenses." Journal of Optics 22.10 (2020): 105104.

Shimoyama, Isao. "Scaling in microrobots." Proceedings 1995 IEEE/RSJ International Conference on Intelligent Robots and Systems Human Robot Interaction and Cooperative Robots. vol. 2. IEEE, 1995, pp. 208-211.

Shrestha, Sajan, et al. "Broadband achromatic dielectric metalenses." Light: Science & Applications 7.1 (2018): 1-11.

Tang, Dongliang, et al. "Single-shot large field of view imaging with scattering media by spatial demultiplexing." Applied optics 57.26 (2018): 7533-7538.

Vo, Sonny, et al. "Sub-wavelength grating lenses with a twist." IEEE Photonics Technology Letters 26.13 (2014): 1375-1378.

Wach, Hans B., Edward R. Dowski, and W. Thomas Cathey. "Control of chromatic focal shift through wave-front coding." Applied Optics 37.23 (1998): 5359-5367.

Wang, Shuming, et al. "A broadband achromatic metalens in the visible." Nature nanotechnology 13.3 (2018): 227-232.

Wang, Shuming, et al. "Broadband achromatic optical metasurface devices." Nature communications 8.1 (2017): 1-9.

West, Paul R., et al. "All-dielectric subwavelength metasurface focusing lens." Optics express 22.21 (2014): 26212-26221.

Ni, Xingjie, Alexander V. Kildishev, and Vladimir M. Shalaev. "Metasurface holograms for visible light." Nature communications 4.1 (2013): 1-6.

Yang, Yuanmu, et al. "Dielectric meta-reflectarray for broadband linear polarization conversion and optical vortex generation." Nano letters 14.3 (2014): 1394-1399.

Yang, Jianji, and Jonathan A. Fan. "Analysis of material selection on dielectric metasurface performance." Optics express 25.20 (2017): 23899-23909.

Wu, Nanfang, and Federico Capasso. "Flat optics with designer metasurfaces." Nature materials 13.2 (2014): 139-150.

Yu, Nanfang, et al. "Light propagation with phase discontinuities: generalized laws of reflection and refraction." science 334.6054 (2011): 333-337.

Zhan, Alan, et al. "Metasurface freeform nanophotonics." Scientific reports 7.1 (2017): 1-9.

Zhan, Alan, et al. "Low-contrast dielectric metasurface optics." ACS Photonics 3.2 (2016): 209-214.

Zheng, Guoxing, et al. "Metasurface holograms reaching 80% efficiency." Nature nanotechnology (2015).

\* cited by examiner

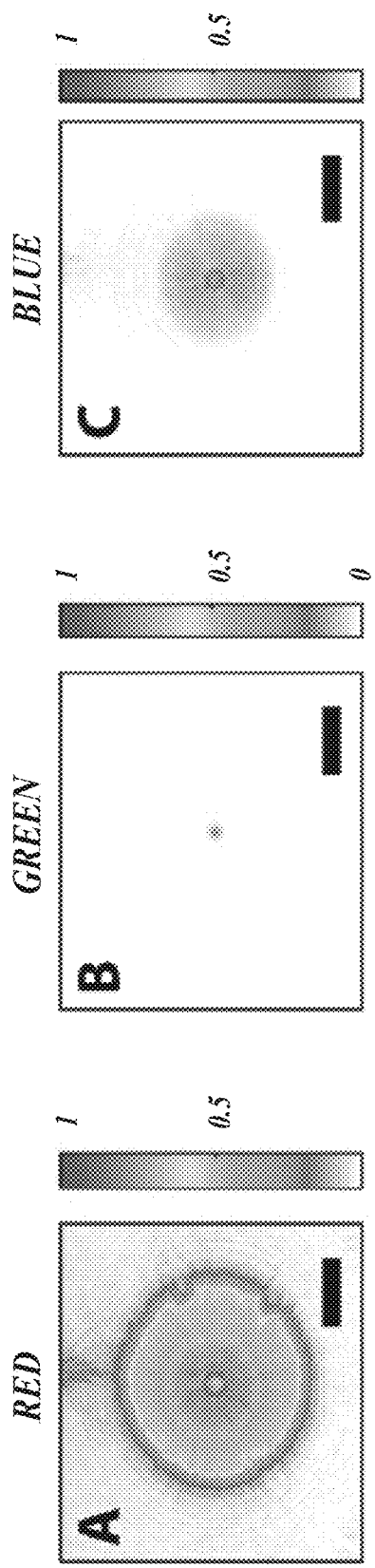

SIMULTANEOUS FOCAL LENGTH CONTROL AND ACHROMATIC COMPUTATIONAL IMAGING WITH QUARTIC METASURFACES

CROSS-REFERENCE TO RELATED APPLICATION

This application claims the benefit of U.S. Provisional Application No. 62/966,471, filed Jan. 27, 2020, the disclosure of which is expressly incorporated herein by reference in its entirety.

BACKGROUND

Conventional imaging systems achieve high-quality achromatic imaging using optical zoom. These systems, however, often entail bulky elements incapable of producing compact next-generation sensors and cameras. In some instances, computational imaging reduces this hardware complexity by replacing sophisticated optics with simple elements and leveraging computation to transfer part of the imaging process into software.

Separately, advancements in microfabrication and nanophotonics have driven development of metasurfaces, enabling miniaturization of optics by using quasi-periodic arrays of subwavelength scatterers to modify incident electromagnetic radiation. By changing the amplitude, phase, and polarization of wavefronts, metasurfaces have enabled ultrathin lenses (metalenses). However, these metalenses produce chromatic aberrations, resulting in blurred images under broadband illumination. To mitigate this, recent improvements have added phase compensation or higher-order terms in the Taylor expansion of a metalens' phase function by utilizing dispersion-engineered scatterers. However, while such numerical compensation may be effective for achromatic focusing with small aperture metalenses, it is not generalizable to large area elements. Furthermore, many of these implementations rely on circular polarization to achieve achromatic focusing over a wide bandwidth, requiring additional polarizers and waveplates. Accordingly, systems and methods for metalenses capable of achromatic focusing of white light are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, an imaging system includes: a first metalens having a plurality of first nanoposts carried by a first substrate; a second metalens having a plurality of second nanoposts carried by a second substrate; and a source of light configured to emit light toward the first metalens and the second metalens. The first metalens is transversely offset with respect to the second metalens.

In one embodiment, the system further includes: a first translation stage configured to move the first metalens in a first transverse direction by a first lateral displacement L1; and a second translation stage configured to move the second metalens in a second transverse direction by a second lateral displacement L2. The first direction is opposite from the second direction.

In one embodiment, the first lateral displacement L1 and the second lateral displacement L2 equal to a same lateral displacement L.

In one embodiment, light passing through the first and the second metalens is focused at a focal length f expressed as:

$$f(L) = \frac{\pi}{2\lambda A L}$$

where $\lambda$ is the wavelength of the light, and A is a constant configured for tuning the focal length f. In another embodiment, a phase shift of the first and the second metalens is expressed as:

$$\theta_{plate}(x, y) = A\left(\frac{1}{3}x^3 + xy^2\right) + B\left(\frac{1}{8}x^4 + \frac{1}{2}xy^3\right)$$

where (x, y) are transverse position coordinates, and wherein B is a constant configured to determine a tunable depth of focus.

In one embodiment, the first metalens is in contact with the second metalens.

In one embodiment, the first nanoposts and the second nanoposts include cylindrical shapes.

In another embodiment, the first nanoposts and the second nanoposts include silicon nitride. In another embodiment, the first nanoposts and the second nanoposts are characterized by characteristic diameters d and characteristic height t that are all at nm scale.

In one embodiment, the system also includes: a microscope configured to image a focal zone of the system; and a photodetector configured to acquire an image of the focal zone.

In one embodiment, a method for focusing an achromatic beam of light includes: transversely offsetting a first metalens and a second metalens, where the first metalens includes a plurality of first nanoposts carried by a first substrate, and a second metalens includes a plurality of second nanoposts carried by a second substrate. The method also includes: illuminating the first metalens and the second metalens with a source of light; and generating a focal area axially away from the first metalens and the second metalens.

In another embodiment, the method also includes: after transversely offsetting the first metalens and the second metalens, bringing the first metalens and the second metalens axially in contact.

In one embodiment, transversely offsetting the first metalens and the second metalens is performed by a first translation stage configured to move the first metalens in a first transverse direction by a first lateral displacement L1, and by a second translation stage configured to move the second metalens in a second transverse direction by a second lateral displacement L2, where the first direction is opposite from the second direction. In another embodiment, the first lateral displacement L1 and the second lateral displacement L2 equal to a same lateral displacement L.

In one embodiment, the focal area is located at a focal length f expressed as:

$$f(L) = \frac{\pi}{2\lambda A L}$$

where λ is the wavelength of the light, and A is a constant configured for tuning the focal length f.

In another embodiment, the method also includes changing a location of the focal area by changing the first lateral displacement L1 and the second lateral displacement L2.

In one embodiment, the light emitted by the source of light is a white light that includes multiple wavelengths, and the focal area includes at least 37% of all white light that passes through the first metalens and the second metalens.

In one embodiment, the method also includes: acquiring images of the light at the focal area; and numerically deblurring the images. In another embodiment, numerically deblurring the images includes using a function:

$$x = \operatorname{argmin}_x TV(x) + \frac{\mu}{2}\|Kx - y\|_2^2$$

where TV denotes a total variation regularizer, μ is a tunable hyperparameter for adjusting a weight assigned to deblurring or denoising, and x and y are Transverse coordinates out the focal area.

In one embodiment, the lateral displacement L is within a range of 25 μm to 125 μm.

In one embodiment, the first nanoposts and the second nanoposts comprise silicon nitride. In another embodiment, the first nanoposts and the second nanoposts have a diameter (d) in a range from 100 nm to 300 nm and a height (t) in a range from 500 nm to 800 nm.

DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein:

FIGS. 8A-8L are graphs of experimental point spread functions (PSFs) in accordance with embodiments of the present technology;

DETAILED DESCRIPTION

While representative embodiments have been illustrated and described, it will be appreciated that various changes can be made therein without departing from the spirit and scope of the invention.

In some embodiments, the inventive technology is capable of simultaneously achieving an achromatic operation and an adjustable focal length using metasurfaces that are translationally offset (also referred to as "laterally offset") from each other. The metasurfaces (also referred to as "metalenses") may be implemented as a pair of wavefront-coded metasurfaces. In some embodiments, the two quartic metasurfaces together form a continuously tunable extended depth of focus (EDOF) lens, exhibiting a near spectrally invariant point spread functions (PSFs) at visible wavelengths for a range of focal lengths. A quartic metasurface may be defined as a metasurface whose phase is characterized by a fourth-order polynomial. These polarization-independent metasurface systems may achieve simultaneous achromatic and varifocal zoom imaging. In some embodiments, in conjunction with a regularized post-capture deconvolution algorithm, the meatasurfaces demonstrate white light imaging of colored patterns over a 5× zoom range.

Figure 1:
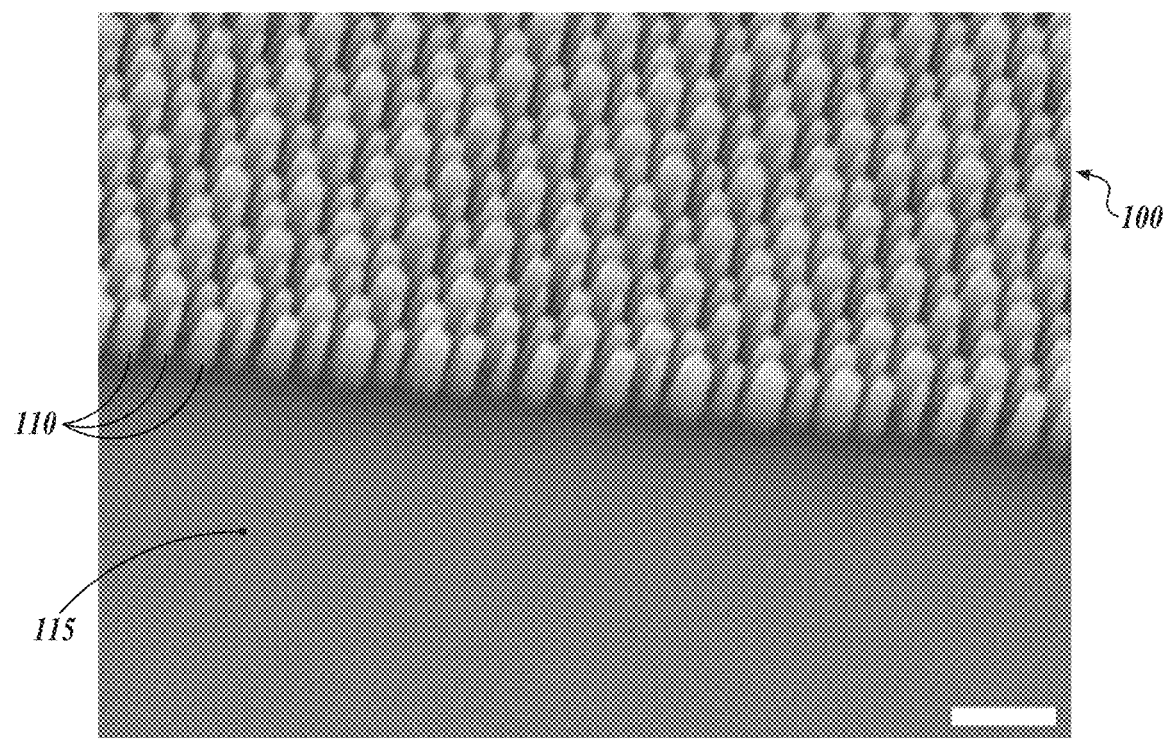
FIG. 1 is a scanning electron micrograph image of a metalens in accordance with an embodiment of the present technology.

FIG. 1 is an optical image of a metalens in accordance with an embodiment of the present technology. Illustrated metalens 100 includes a number of nanostructures (also referred to as "nanoposts" or "scatterers") 110 that are carried by a substrate (also referred to as a "carrier") 115. The nanostructures 110 may be nanoscale structures that are generally cylindrical and characterized by one or more characteristic scales (e.g., cylinder diameter d). In some embodiments, the nanostructures 110 may have different sizes, as illustrated in FIG. 1. In different embodiments, the metalens 100 may be manufactured by the process described below.

In some embodiments, during the manufacturing of the metalens 100, a 600 nm layer of silicon nitride is first deposited via plasma-enhanced chemical vapor deposition (PECVD) on a quartz substrate, followed by spin-coating with a high-performance positive electron beam resist (e.g., ZEP-520A). An 8 nm Au/Pd charge dissipation layer was then sputtered followed by subsequent exposure to an electron-beam lithography system (e.g., JEOL JBX6300FS). The Au/Pd layer may then be removed with a thin film etchant (e.g., type TFA gold etchant), and the samples may be developed in amyl acetate. In some embodiments, to form an etch mask, 50 nm of aluminum is evaporated and lifted off via sonication in methylene chloride, acetone, and isopropyl alcohol. The samples are then dry etched using a CHF3 and SF6 chemistry and the aluminum is removed by immersion in AD-10 photoresist developer.

Figure 2A:
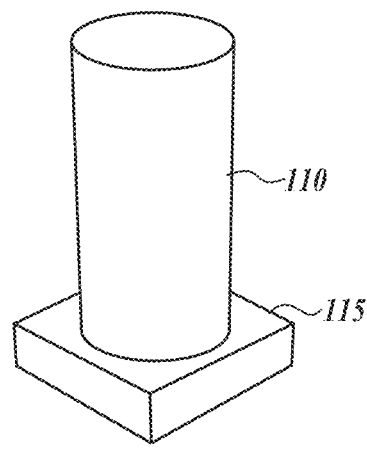
FIGS. 2A-2C illustrate several views of metalens' nanoposts in accordance with embodiments of the present technology.
Figure 2B:
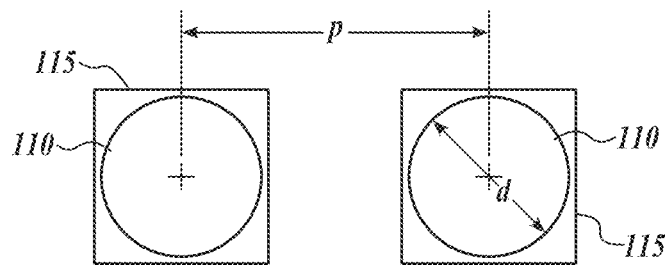
Figure 2C:
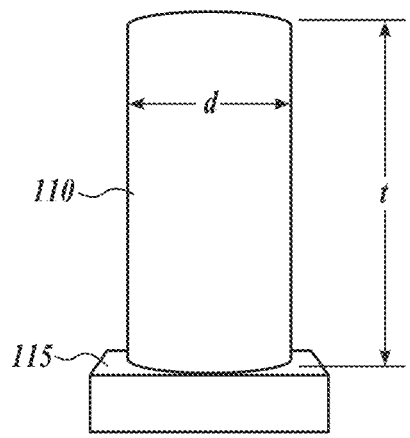

FIGS. 2A-2C illustrate several views of metalens' nanoposts in accordance with embodiments of the present technology. FIG. 2A is an isometric view of a nanopost 110 that is carried by a substrate 115. The illustrated nanopost 110 is cylindrical, but in other embodiments the nanopost 110 may have other shapes, for example, an elliptical cross-section, a square cross-section, a rectangular cross-section or other cross-sectional shape that maintain center-to-center spacing at a sub-wavelength value. FIG. 2B is a top view of two adjacent nanoposts that are separated by a distance "p" (pitch). Only two nanoposts are illustrated in FIG. 2B for simplicity. However, for a practical metalens 100, many more nanoposts are distributed over the substrate 115. FIG. 2C is a side view of a nanopost 110 that is carried by a substrate 115. In some embodiments, the nanoposts (scatterers) 110 are made of silicon nitride due to its broad transparency window and CMOS compatibility.

The illustrated nanoposts 110 are characterized by a height "t" and diameter "d". In some embodiments, the values of "d" may range from about 100 nm to about 300 nm. Generally, the value of "t" (height) is constant (within the limits of manufacturing tolerance) for all diameters "d" for a given metalens. In some embodiments, the values of "t" may range from about 500 nm to about 800 nm. The nanoposts (scatterers) may be polarization-insensitive cylindrical nanoposts 110 arranged in a square lattice on a quartz substrate 115. The phase shift mechanism of these nanoposts arises from an ensemble of oscillating modes within the nanoposts that couple amongst themselves at the top and bottom interfaces of the post. By adjusting the diameter "d" of the nanoposts, the modal composition varies, modifying the transmission coefficient through the nanoposts.

Figure 3:
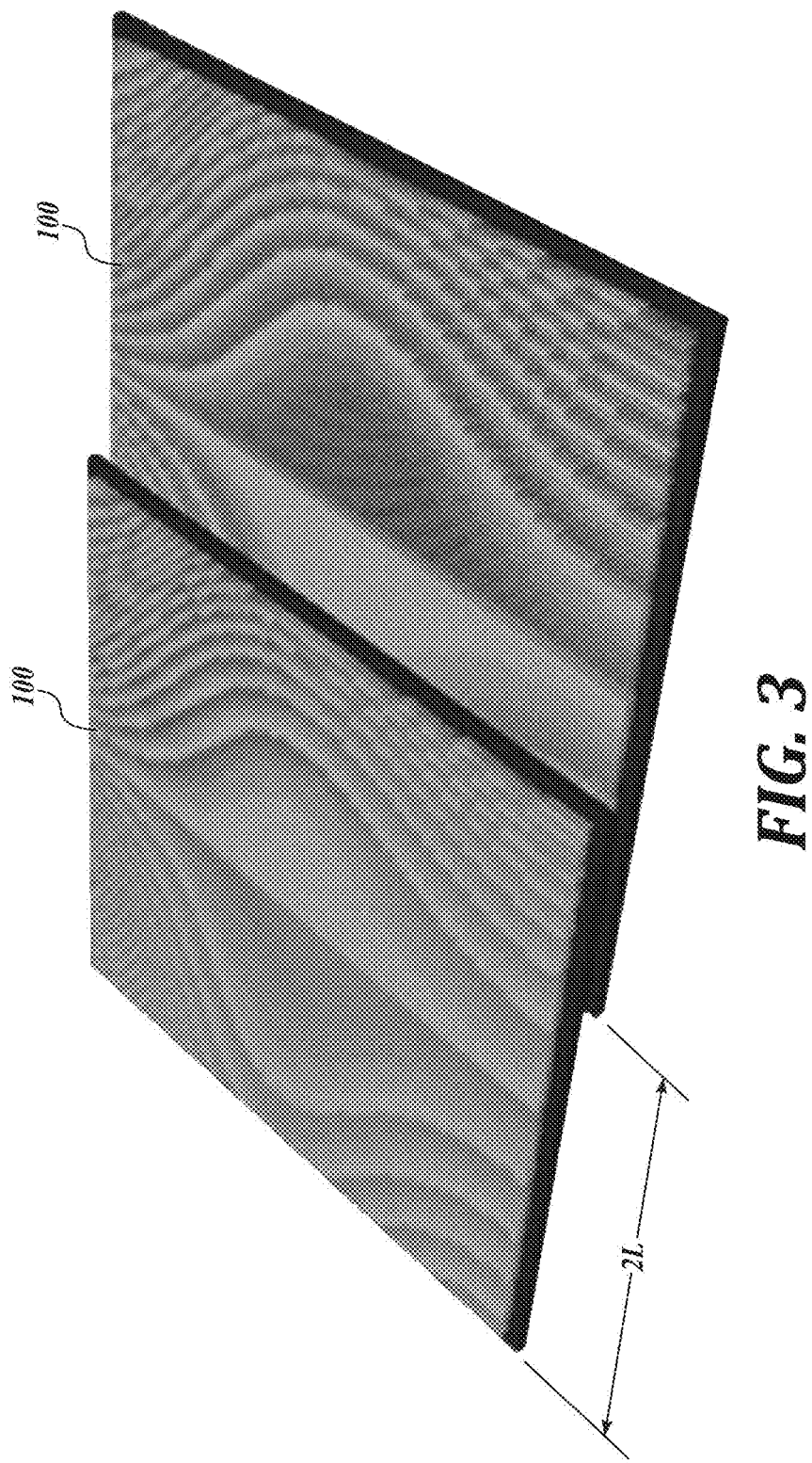
FIG. 3 illustrates metalens pairing in accordance with an embodiment of the present technology.

FIG. 3 illustrates metalens pairing in accordance with an embodiment of the present technology. In operation, the metalenses 100 are offset laterally by a distance 2L, as described further in reference to equations 1-7 below. The illustrated distance 2L in FIG. 3 is exaggerated for emphasis. In practical applications, the distance (displacement) 2L is comparable (e.g., is at the same order of magnitude) to the scale "d" of the nanopost itself. Continuous lateral displacement (2L) of these conjugate metalenses 100 produces a tunable focal length EDOF lens. The illustrated pairing of the metalenses 100 may also be referred to as an EDOF "Alvarez metalens."

Figure 4A:
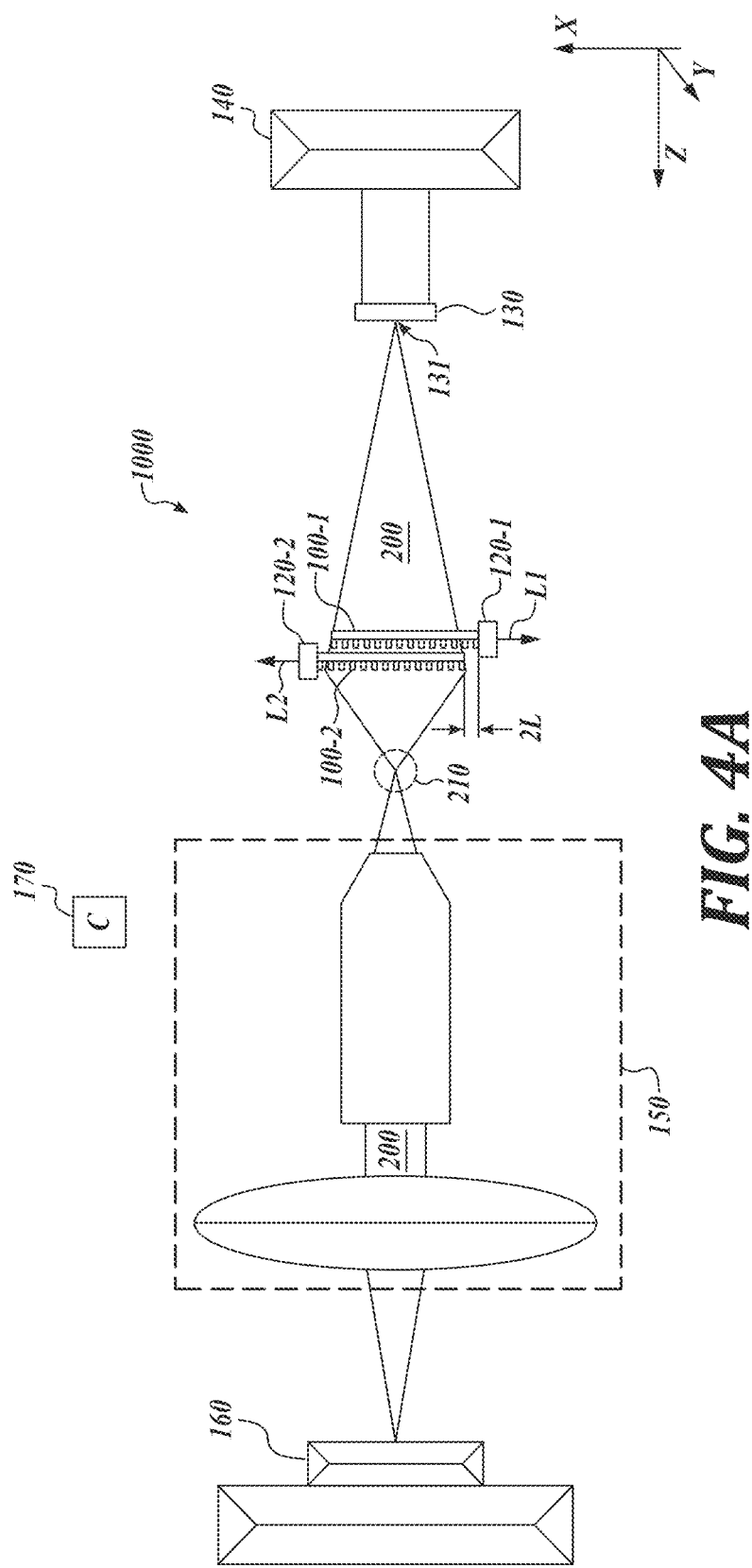
FIGS. 4A and 4B illustrate optical systems in accordance with embodiments of the present technology.
Figure 4B:
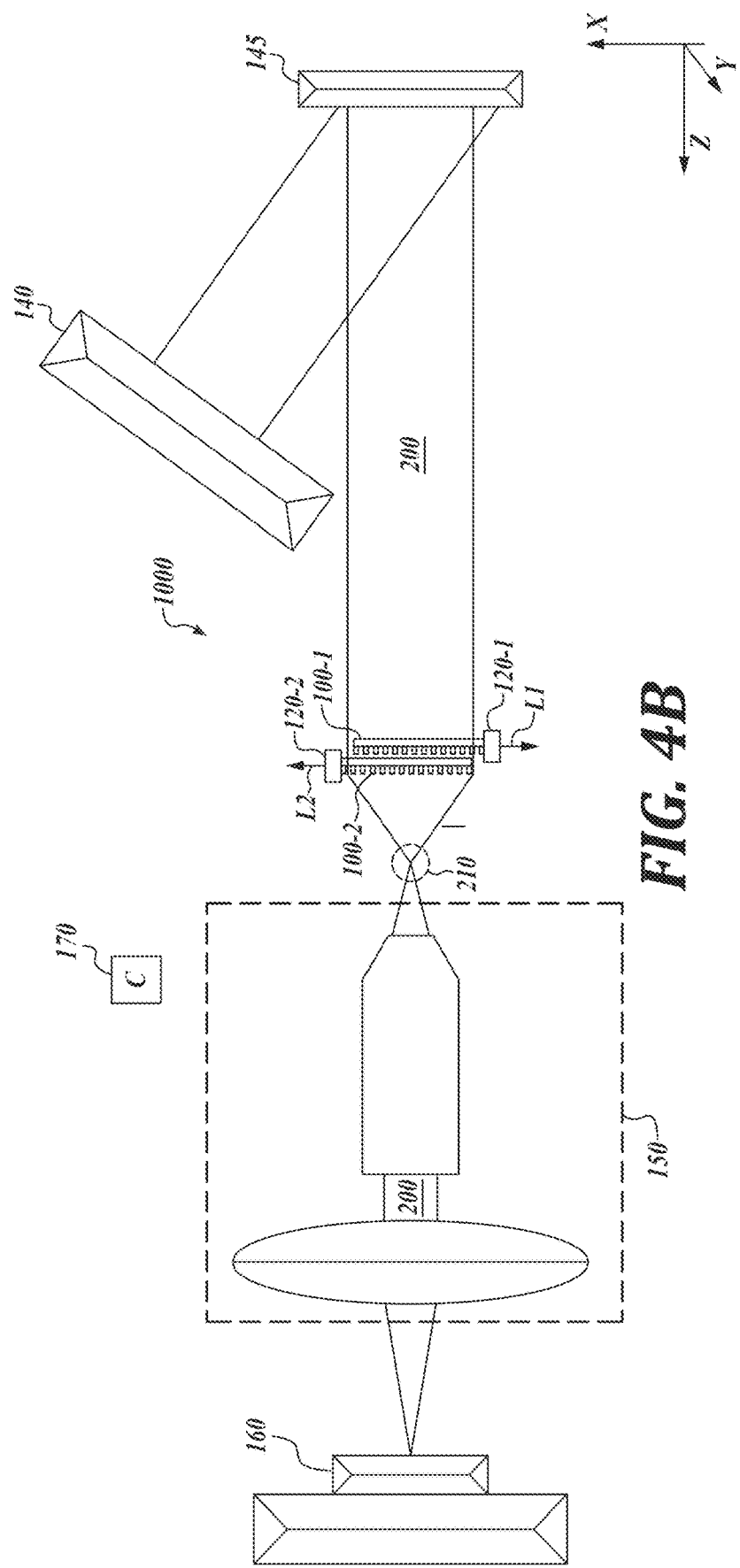

FIGS. 4A and 4B illustrate optical systems in accordance with embodiments of the present technology. In particular, FIG. 4A illustrates an optical system 1000 having a source of collimated light 140 that directs light through plate 130 having a pinhole 131. The light passing through the pinhole 131 expands as a light beam 200 toward metasurfaces 100-1 and 100-2.

The two metasurfaces 100-1 and 100-2 are laterally offset by a distance 2L. For example, the metasurface 100-1 may be moved in one direction by L1, while the metasurface 100-2 is moved in another direction by L2. Collectively, the two metasurfaces are offset laterally (also referred to as transverse direction) by a distance of 2L that corresponds to a sum of L1 and L2. In different embodiments, movement of the metasurfaces 100-1 and 100-2 may be controlled by manual thread screws, manual stages, automated stages, solenoids, micro electro-mechanical systems (MEMS), etc. In some embodiments, when in their operational position, the metasurfaces 100-1 and 100-2 may be planarly adjacent to each other (e.g., within the µm or several hundred nm length scale) or may be touching each other.

The focal field is designated by numeral 210. A sample coordinate system XYZ indicates a direction of the light along axis Z (also referred to as axial direction that is perpendicular to transverse direction), whereas a cross sectional direction of the focal field 210 is in the plane XY. As further explained below, the lateral offset of the two metasurfaces determines location and depth of the focal field for different wavelengths.

In different embodiments, the focal field 210 is observable by a microscope 150 (or another optical system). Image of the focal field may be obtained by a photo detector 160 (e.g., a camera, for example, a charge-coupled device (CCD) camera). In operation, the photodetector 160 records an image of the pinhole 131. Operation of the system may be controlled by a controller 170. Some examples of the functions executed the controller 170 are offsetting of the metasurfaces (2L), calculation of the correction parameters of the operation for different wavelength (as further explained below), etc.

FIG. 4B illustrates another embodiment of the optical system 1000. In the illustrated embodiment the plate 130 and pinhole 131 are replaced by a source of collimated light 140 and a mirror with printed object pattern 145. In operation, the printed object pattern 145 is projected in the focal zone 210 and may be recorded by the photodetector 160 for further analysis and/or image processing.

Design of the Metalenses

In some embodiments, two cubic phase elements (i.e., the two metalenses forming an Alvarez lens) are positioned in series along the optical axis. Examples of such arrangement are shown in FIGS. 4A and 4B, where the optical axis extends along Z direction. When the elements in an Alvarez lens are in alignment, the net phase delay is zero, as their spatial phase shifts exactly cancel each other according to:

$$\theta_1(x,y) = -\theta_2(x,y) = A(\tfrac{1}{3}x^3 + xy^2), \tag{1}$$

where A is a constant and (x, y) are the in-plane position coordinates. On the other hand, when the two elements are laterally shifted in opposite directions (e.g., directions L1 and L2 in FIGS. 4A and 4B), the superposition of their phase profiles yields a quadratic function. The focus of the quadratic function depends on the relative displacement, yielding a varifocal lens with a phase function:

$$\varphi_{Alvarez}(x,y) = \theta_1(x+L,y) + \theta_2(x-L,y) = 2AL(x^2+y^2) + \tfrac{2}{3}L^3, \tag{2}$$

and a focal length $$f(L) = \frac{\pi}{2\lambda AL}, \tag{3}$$

where L is the lateral displacement and $\lambda$ is the wavelength. If the phase elements are implemented as metasurfaces, however, the system exhibits a significant chromatic focal shift, typical for diffractive lenses. Its point spread function (PSF) is strongly wavelength-dependent and yields zeros for large spatial frequency bands in the corresponding modulation transfer functions (MTFs) for wavelengths deviating from the designed value. However, the addition of a cubic term to a metalens' phase profile provides an EDOF that yields a PSF that is nearly insensitive to chromatic focal shift. Instead of focusing to a point like a metalens, such an element produces a focused Airy beam and an asymmetric PSF that blurs images. Via a monochromatic PSF calibration measurement, however, this blur can be negated via deconvolution across the visible spectrum. However, such a deconvolution approach cannot be applied for the case of a singlet metalens (i.e., the case of just one metalens in the path of light) under white light illumination, as the wavelength dependence of the PSF and the large increase in PSF size results in a loss of higher spatial frequency information that deconvolution cannot recover. Modifying equation (2) to include a cubic term, neglecting the $L^3$ constant phase, and substituting the focal length from equation (3), the phase $$\varphi_{EDOF} = \frac{\pi(x^2+y^2)}{\lambda f} + \frac{\alpha}{R}(x^3+y^3), \tag{4}$$

simultaneously imparts the profile for a focusing lens and extends its depth of focus. Here, R denotes half the aperture width and $\alpha$ is the cubic phase strength (i.e., the number of 2π cycles from the cubic phase term when traversing a path from the origin to the aperture edge in the x direction). Expressing $\varphi_{EDOF}$ as a superposition of two oppositely signed and laterally displaced phase functions, $$\varphi_{EDOF}=\theta_{plate}(x+L,y)-\theta_{plate}(x-L,y), \quad (5)$$

we can relate the derivative of $\theta_{plate}$ to this difference and $\varphi_{EDOF}$ via the two-sided definition of the derivative as below:

$$\frac{\partial \theta_{plate}}{\partial x} = \lim_{L\to 0}\frac{\theta_{plate}(x+L,y)-\theta_{plate}(x-L,y)}{2d}\lim_{d\to 0}\frac{\varphi_{EDOF}}{2L}, \quad (6)$$

Making the substitution $$\frac{\alpha}{R^3} = BL,$$

where B is a constant, we can find:

$$\theta_{plate}(x,y)=A(\tfrac{1}{3}x^3+xy^2)+B(\tfrac{1}{5}x^4+\tfrac{1}{2}xy^3), \quad (7)$$

When B=0, $\theta_{plate}=\theta_1$ and the superposition of the two laterally displaced plates behaves exactly as an Alvarez lens. However, for nonzero B, $\theta_{plate}$ becomes a quartic phase polynomial in x. Continuous lateral displacement of these conjugate plates yields a tunable focal length EDOF lens with a phase distribution given by equation (4). Instead of focusing to a point, the system described by above equations produces a tunable focused accelerating beam that generates spectrally invariant point spread functions that enable wavelength-uniform deconvolution for each focal length. In some embodiments, such device may be referred to as an EDOF Alvarez metalens. In practical implementation, such device combines the functionality of both tunable focusing (determined by the coefficient A) and tunable wavefront coding (determined by the coefficient B) with only two elements (e.g., two metalenses or metasurfaces 100).

As explained with reference to FIGS. 1-2C, the metasurfaces can be implemented as silicon nitride nanoposts, due to a broad transparency window and CMOS compatibility of the silicon nitride. The phase shift mechanism of the nanoposts arises from an ensemble of oscillating modes within the nanoposts that couple amongst themselves at the top and bottom interfaces of the post. By adjusting the diameter of the nanoposts, the modal composition varies, modifying the transmission coefficient. For example, to change the focal length from 6 mm to 1.2 mm by tuning L from 25 μm to 125 μm at 530 nm wavelength, a value of $A=1.98\times 10^{13}$ m$^{-3}$ is used. A lower value of A increases the focal length but reduces the numerical aperture for a fixed metasurface size. The value of B depends on the desired operating wavelength range, which, for example, may span from blue (455 nm) to red (625 nm) light. Higher values of B increase the depth of focus (in a more generic sense—tunable wavefront) at the cost of reducing the signal-to-noise-ratio (SNR). As the range of chromatic focal shift increases with a wider optical bandwidth, however, the focal depth must be extended to ensure a spectrally invariant PSF over the whole wavelength range. For many practical wavelength ranges, $B=7.59\times 10^{16}$ m$^{-4}$ satisfies this requirement.

Simulations were done using rigorous coupled-wave analysis (RCWA) to simulate the amplitude and phase of the transmission coefficient of the nanoposts. The refractive index of Si3N4 (SiO2) was set to 2.077 (1.465), 2.056 (1.461), and 2.041 (1.457) for 455 nm (blue), 530 nm (green), and 625 nm (red) wavelengths respectively. The PSFs were simulated by treating the metasurfaces in the design as complex amplitude masks, where each pixel's diameter maps to the corresponding amplitude and phase from the RCWA-simulated transmission coefficient. The light propagation to calculate the PSFs is modeled via the angular spectrum method. The modulus squared of the calculated field then yields the incoherent PSF.

Experimental and Computational Characterization

Figure 5:
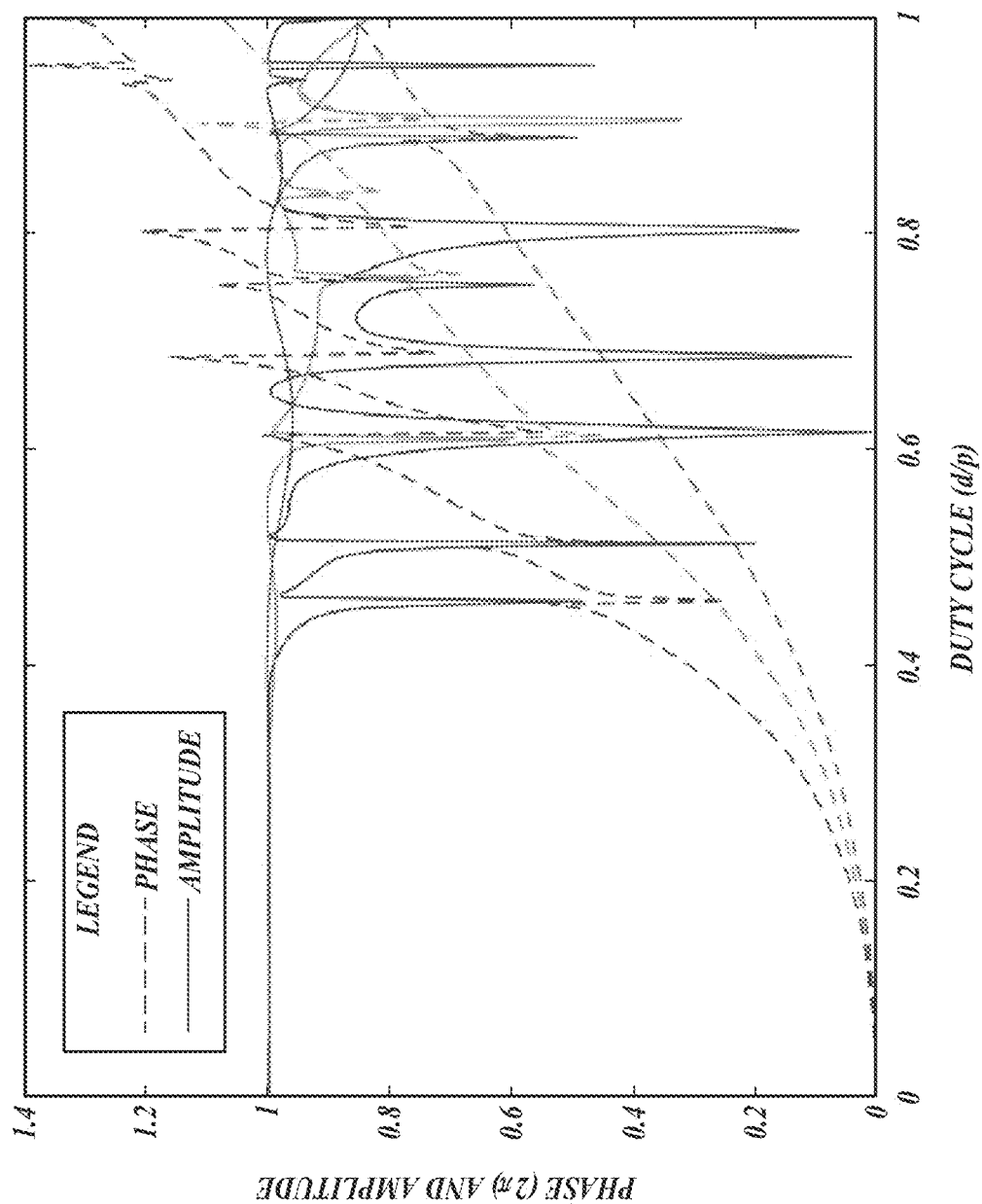
FIG. 5 is a graph of multiwavelength transmission coefficient in accordance with an embodiment of the present technology.

FIG. 5 is a graph of multiwavelength transmission coefficient in accordance with an embodiment of the present technology. The horizontal axis shows a duty cycle, expressed as a diameter of the nanopost (d) over a pitch (p) from one nanopost to another. The vertical axis represents phase and amplitude of different wavelengths of light (blue, red and white). In particular, the nanoposts were designed to operate at a nominal wavelength of green light, 530 nm. However, the performance of the nanoposts was also examined under blue (455 nm) and red (625 nm) illumination to enable calculation of PSFs at these wavelengths. From the illustrated graph in FIG. 5, it can be observed that the amplitude of the light at the focal area remains relatively constant once the isolated dips corresponding to harmonics are avoided. A similar observation may be extended to the observed phases of these three wavelengths.

Figure 6:
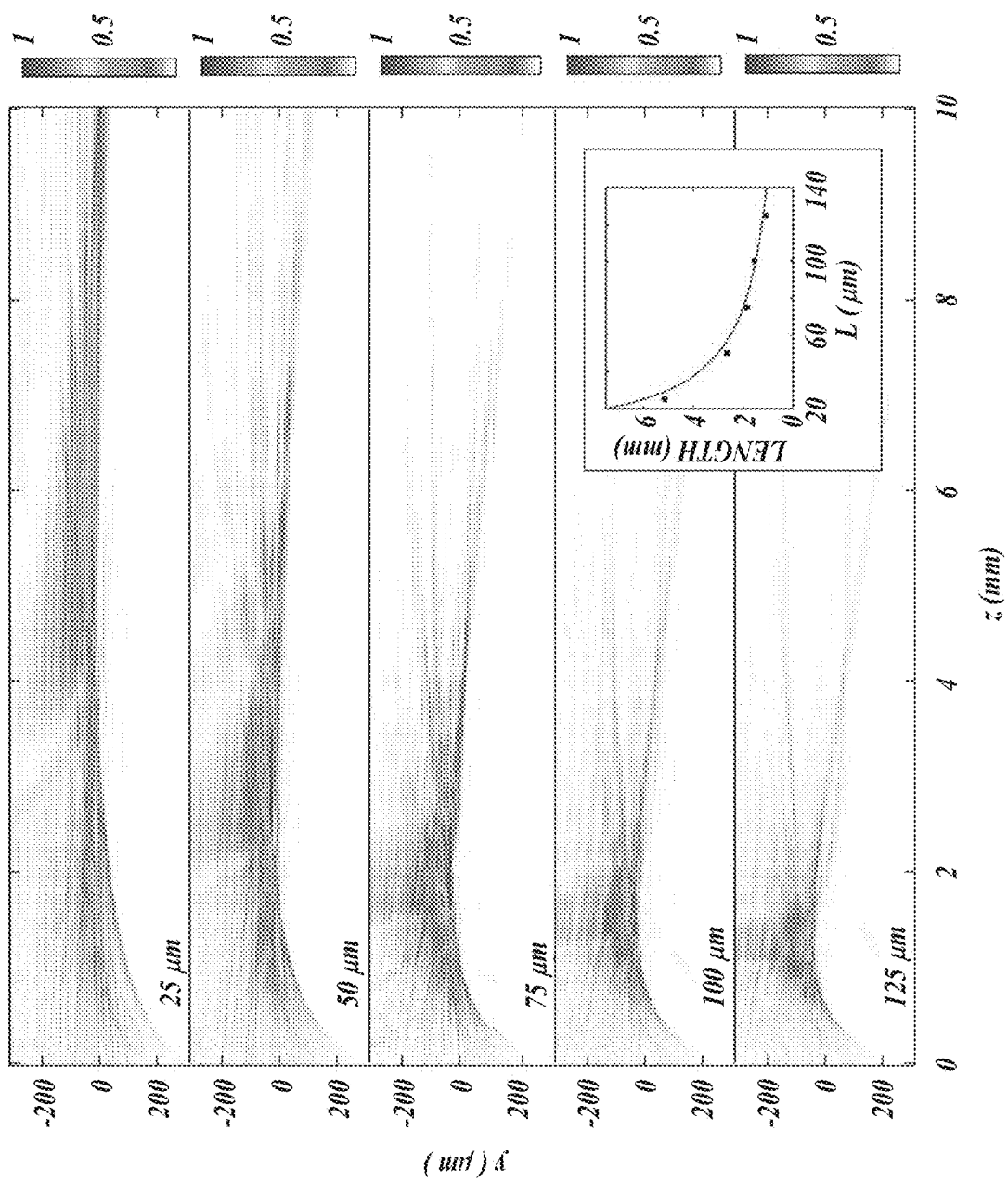
FIG. 6 is a graph of focal intensities in accordance with embodiments of the present technology.

FIG. 6 is a graph of focal intensities in accordance with embodiments of the present technology. The horizontal axis represents axial distance Z along the path of light. The vertical axis represents cross sectional dimension Y of the focal area (X being kept at zero). The color legend represents the intensity of light along the axial distance. The inset depicts Z distance to the point of maximum measured intensity (black dots) compared to the theoretical focal length of an Alvarez lens without an EDOF (red curve). Specific lateral offsets L at which the measurements of the light intensity were performed are 25 μm, 50 μm, 75 μm, 100 μm, and 125 μm. Each of these specific lateral offsets L is illustrated as one of the vertically stacked graphs in FIG. 6. For each tuning state, the focal spot (red zone) exhibits an extended depth, and the Z-position of maximum intensity for each state agrees well with the theoretical focal length of a conventional Alvarez metalens, i.e., for B=0 (FIG. 3 inset). This demonstrates that for each lateral offset L there is a focal area having a controllable distance along Z axis. As both the quadratic and cubic terms in equation (4) are proportional to L, the depth of focus also increases with increasing focal length.

Figure 7A:
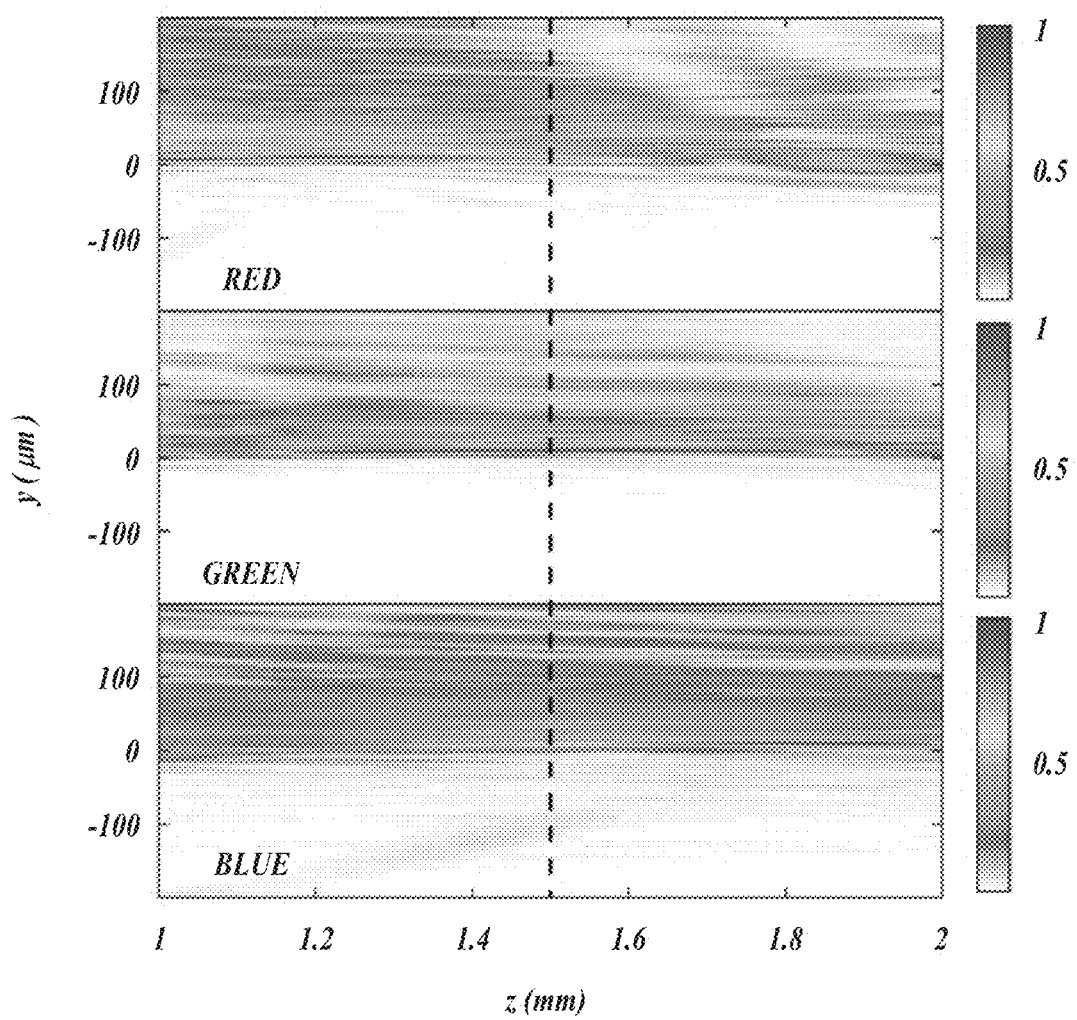
FIGS. 7A and 7B are graphs of focal intensities in accordance with embodiments of the present technology.
Figure 7B:
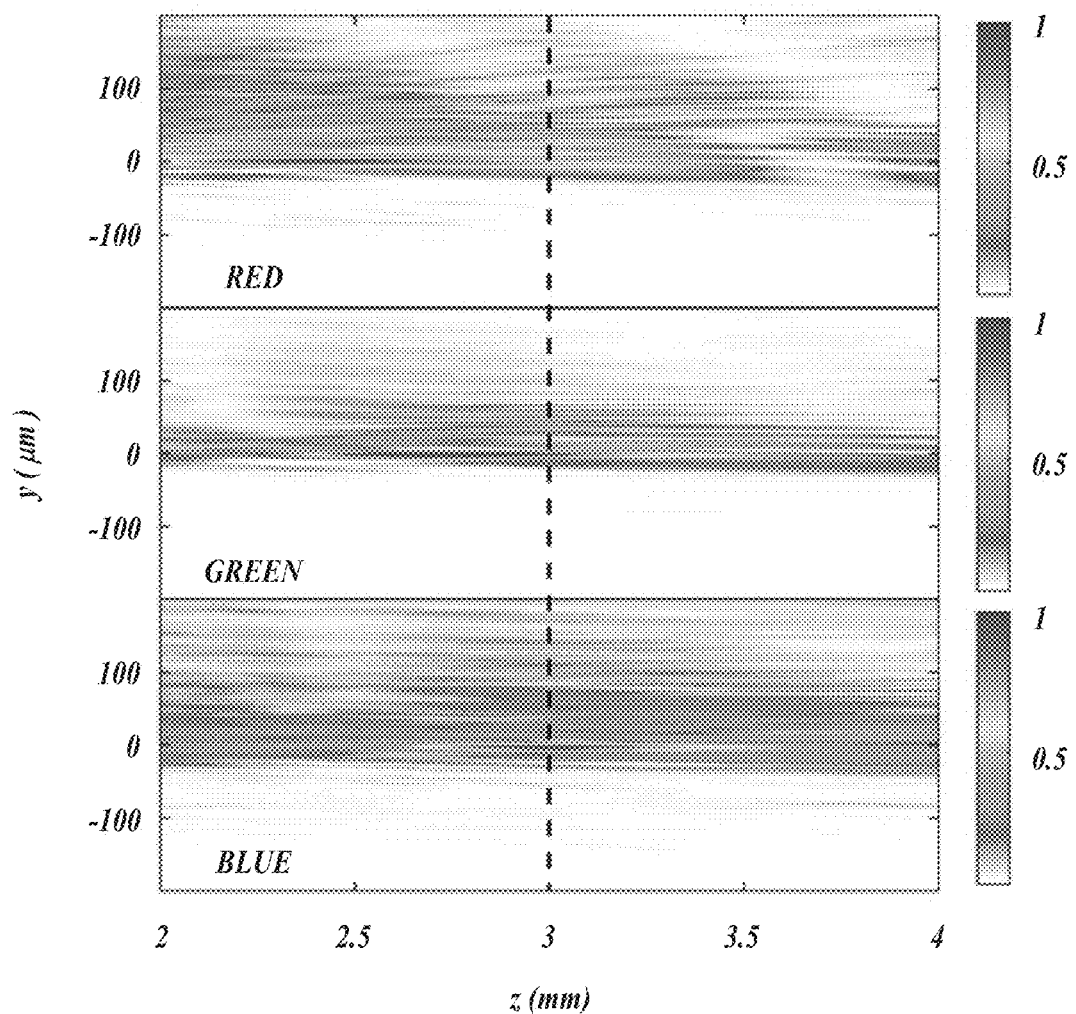

FIGS. 7A and 7B are graphs of focal intensities in accordance with embodiments of the present technology. Analogously to FIG. 6, the horizontal axis represents axial distance Z along the path of light. The vertical axis represents cross sectional dimension Y of the focal area (X being kept at zero). The color legend represents the intensity of light along the axial distance Z. FIG. 7A shows the light intensity for the case of a 100 μm lateral displacement (L) at the 1.5 mm (Z) focal plane. FIG. 7B shows the light intensity for the case of a 50 μm lateral displacement (L) about the 3 mm focal plane. The measurements were performed for red light (625 nm), green light (530 nm), and blue light (455 nm).

While the longitudinal shift of the extended focal spot is significant over the wavelength range measured, for all three wavelengths the spatial intensity distributions at the desired focal plane (indicated by the dashed lines) are similar. As a result, for both illustrated lateral displacements (L of 100 μm and 50 μm) a suitable focal length (Z) can be identified such that the light can be focused for all three wavelengths of interest (red, green, blue), therefore generating spectrally invariant PSFs with EDOF Alvarez metalens.

FIGS. 8A-8L are graphs of experimental point spread functions (PSFs) in accordance with embodiments of the present technology. The horizontal and vertical axes represent X and Y coordinates of the cross section of the focal area. The color legend represents the intensity of light at the focal point. FIGS. 8A-8C and 8G-8I were obtained with a single metalens, while FIGS. 8D-8F and 8J-8L were obtained using a pair of metalenses that were offset as illustrated in, for example, FIGS. 4A and 4B. In particular, FIGS. 8D-8F correspond to the metalenses with a lateral displacement (L) of 100 µm and a focal point at 1.5 mm, and FIGS. 8J-8L correspond to the metalenses with a lateral displacement (L) of 50 µm and a focal point at 3 mm. Equivalent single metalens (also referred to us "singlet") is depicted for the 1.5 mm focal point singlet in FIGS. 8A-8C, and 3 mm focal point in FIGS. 8G-8I. Scale bar is 78.3 µm. In all cases, white light was used. To verify the spectral invariance of the system, the PSFs were measured for different values of L and compared to those of a static singlet metalens with a phase given by:

$$\varphi_{singlet}(x, y) = \frac{2\pi}{\lambda}\left(f - \sqrt{x^2 + y^2 + f^2}\right), \quad (8)$$

Figure 8G:
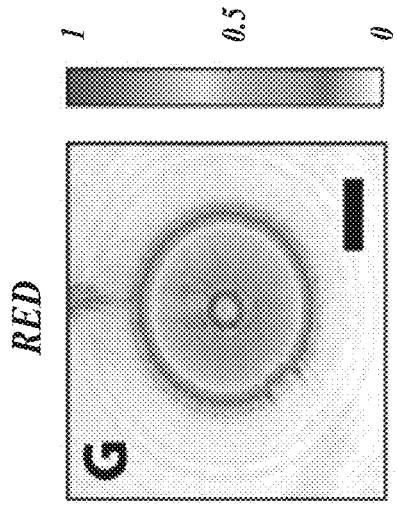
Figure 8H:
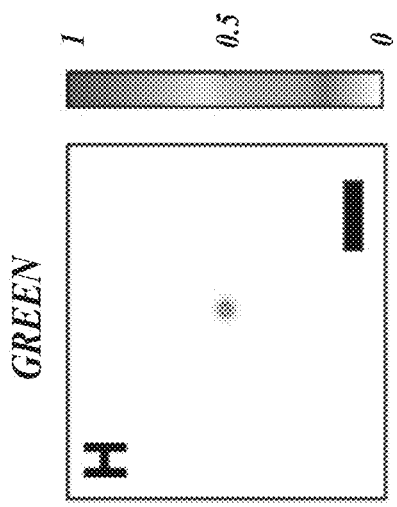
Figure 8I:
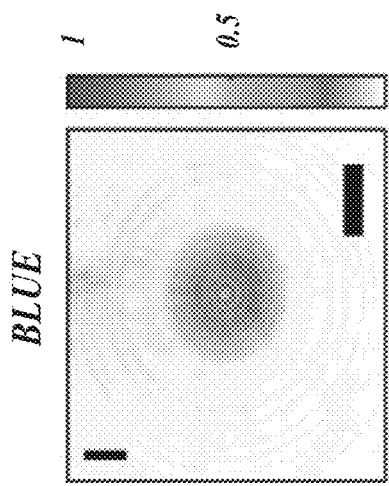
Figure 8J:
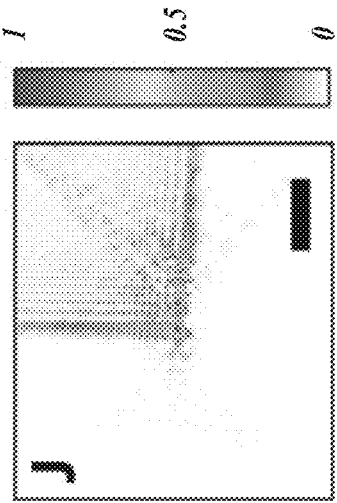
Figure 8K:
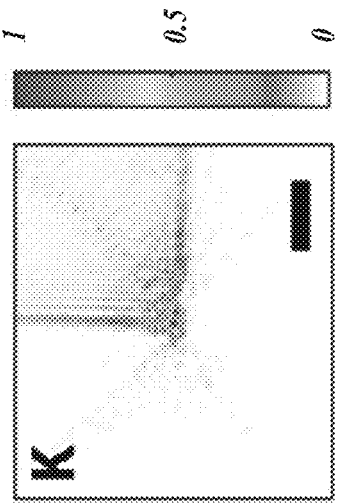
Figure 8L:
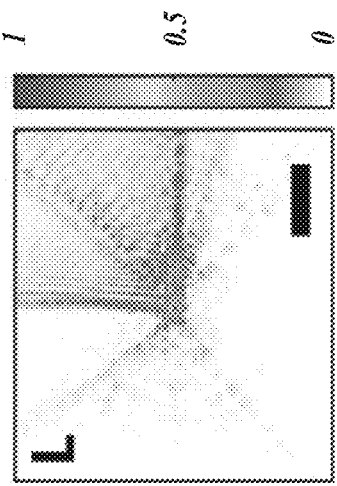

The single metalenses (singlets) had 1 mm apertures for green light (wavelength 530 nm). Their PSFs are shown in FIGS. 8A-8C for 1.5 mm and FIGS. 8G-8I for 3 mm focal lengths, respectively. While these singlet elements produce a tightly focused PSF for the green design wavelength (FIGS. 8B, 8H), they vary drastically at other wavelengths, generating large diffraction blurs under red (FIGS. 8A, 8G) and blue (FIGS. 8C, 8I) illumination. For the case of the pair of metalenses that are offset (Alvarez EDOF metalens), however, the PSFs remain much more similar under different illumination wavelengths as illustrated in FIGS. 8D-8F for a displacement (L) of 100 µm, and FIGS. 8J-8L for a displacement of 50 µm. These PSFs are measured at the same focal plane position as the corresponding 1.5 mm, 3 mm singlet metalens. Therefore, while the singlet metalens provides good focusing only at its design wavelength (green wavelength in the illustrated case), the pair of metalenses that are offset provide reasonably good focusing at all wavelengths of interest.

Figure 9:
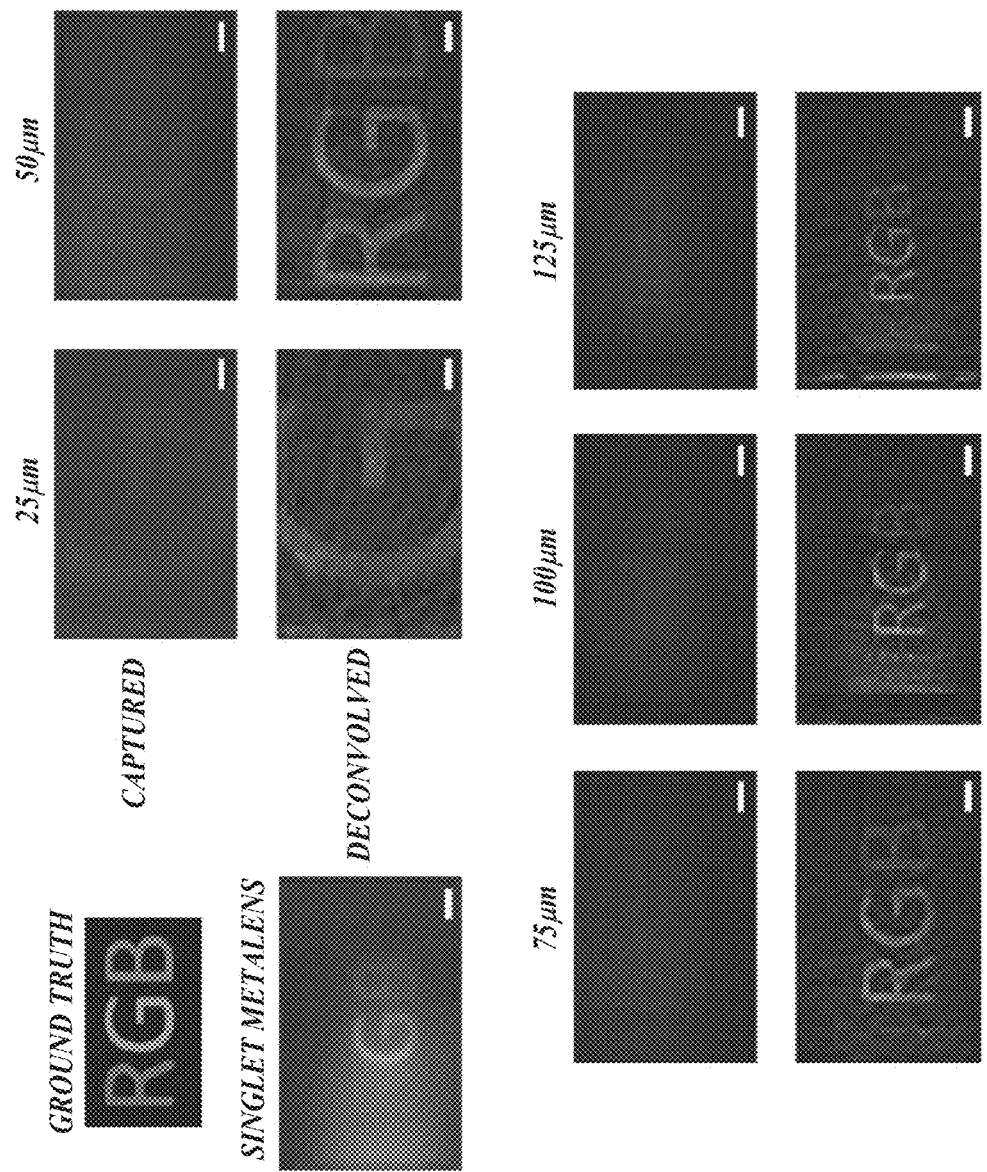
FIG. 9 is a graph comparing ground truth images to experimental captures in accordance with embodiments of the present technology.

FIG. 9 is a graph comparing ground truth images to experimental captures in accordance with embodiments of the present technology. White light images are shown depicting a ground truth object "RGB" text. Also shown are images captured using the 1.5 mm singlet metalens under white light for comparison, and the images from the pair of metalenses that are laterally offset (Alvarez EDOF metalens) before and after deconvolution for five different lateral displacements ranging from 25 µm to 125 µm. Scale bar is 62 µm in all images.

Leveraging the wavelength insensitivity of the Alvarez EDOF metalens PSF, the above imaging experiment includes capturing and deconvolving images of object patterns under white light illumination. A sample experimental setup is illustrated in FIGS. 4A and 4B. The image model can be compactly summarized via the equation y=Kx+n, where y denotes the vectorized blurry captured image, K is a matrix form of the measured PSF, n is noise, and x is the latent image to be reconstruct. Various deconvolution algorithms have been employed to solve this problem in computational imaging systems. In some embodiments, x is determined using a regularized approach based on the total variation regularizer, so to balance the tradeoff between deblurring and denoising, described via:

$$x = \operatorname{argmin}_x TV(x) + \frac{\mu}{2}\|Kx - y\|_2^2, \quad (9)$$

In this equation, TV denotes the total variation regularizer and µ is a tunable hyperparameter that can adjust the weight assigned to deblurring or denoising.

Applying this framework to the system 1000, the "RGB" text at five different magnification levels was reconstructed by tuning the lateral displacement of the metasurfaces. While a separate PSF is required for deconvolution in each tuning state, their near wavelength-invariant behavior enables a use of the same PSF for all colors. The images of the same "RGB" text were captured with the 1.5 mm singlet metalens for comparison. While much of the color content in the ground truth objects is smeared out by the large diffraction blurs of the singlet metalens, different colors are far more distinct for the deconvolved EDOF metalens images. Prior to deconvolution, the captured EDOF metalens' images are blurry for all colors, but the near spectrally invariant nature of the blur is the enabling condition for deconvolution with a single filter. Furthermore, while the singlet metalens is capable of imaging at only one magnification because of its static nature, in tuning the displacement of the metalenses that are laterally offset (Alvarez EDOF metalens) from 25 µm to 125 µm and shifting the image plane, the magnification is seamlessly swept over a 5× zoom range.

Therefore, unlike metasurfaces optimized for operation at discrete wavelengths (e.g., at only red, green, or blue wavelength), the system illustrated in FIGS. 4A and 4B can produce in-focus images for intermediate colors such as yellow. In some embodiments, the inventive technology produces metasurface-based achromatic varifocal zoom by sacrificing signal-to-noise ratio (SNR) to extend the depth of focus and by adding post-processing software to the imaging pipeline. This adds power consumption to an imaging process that is conventionally passive and produces a latency that may hinder real-time operation when capturing video. The deconvolution algorithm, however, may be hardware-accelerated by using field-programmable gate arrays (FPGAs) or adapted to run on state-of-the-art graphics processing units (GPUs) to enable real-time processing. Furthermore, in any application where real-time operation is unnecessary, all captured frames could be subsequently deconvolved offline. In different embodiments, such processing may be executed by the controller 170.

Figure 10:
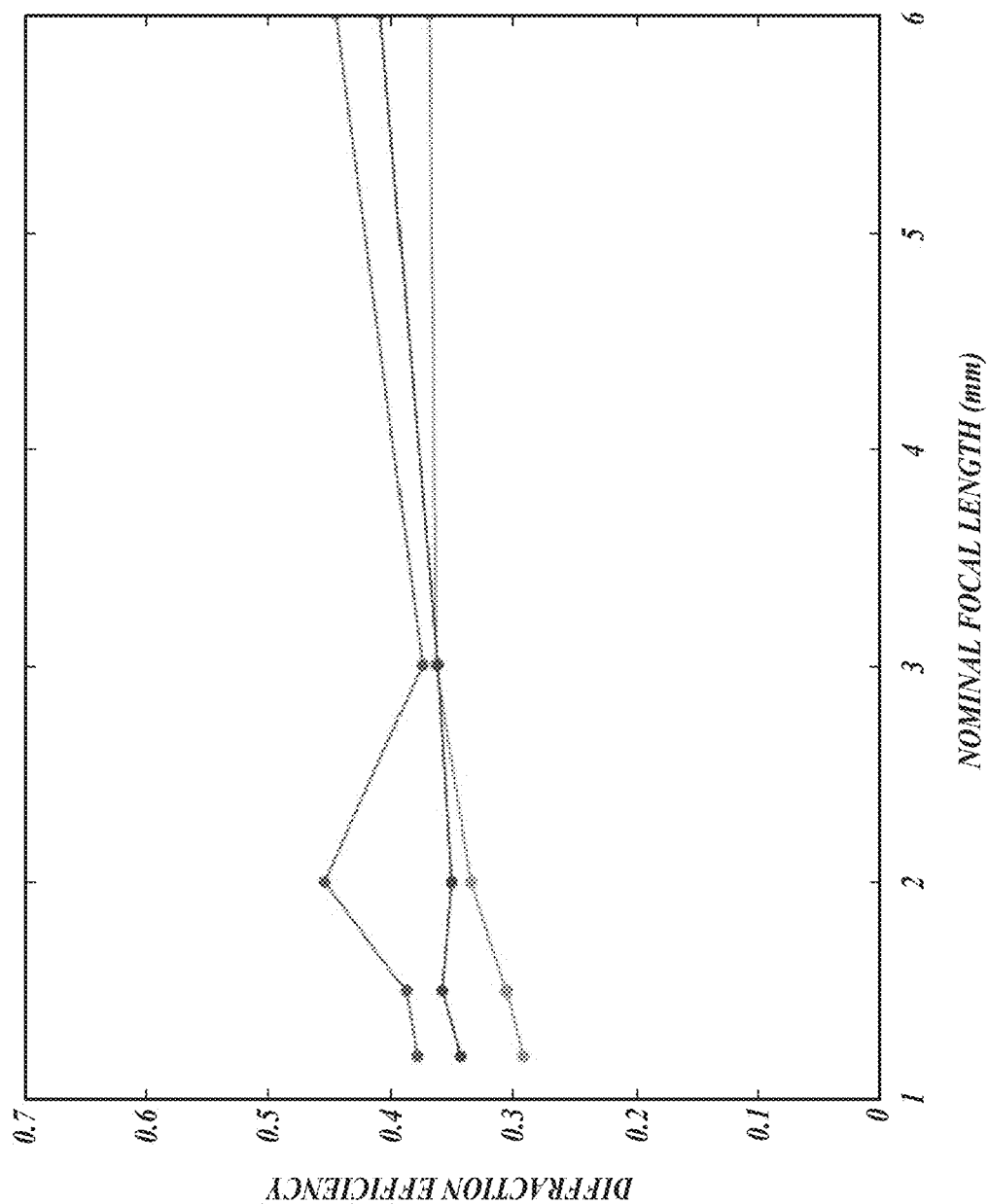
FIG. 10 is a graph of measured diffraction efficiency in accordance with an embodiment of the present technology.

FIG. 10 is a graph of measured diffraction efficiency in accordance with an embodiment of the present technology. The horizontal axis indicates a nominal focal length in mm. The vertical axis indicates a diffraction efficiency as a fraction of light that was focused in the target focal area. The measured diffraction efficiencies for 625 nm (red), 530 nm (green), and 455 nm (blue) wavelengths are shown as a function of nominal focal length, corresponding to lateral displacements in the range of 25 µm to 125 µm. The tested pair of metalenses achieved an average diffraction efficiency of 37% at the three test wavelengths (blue, green, and red) over the 25 µm to 125 µm actuation range. This indicates that for all wavelengths of interest, on average 37% of all light that passes through the metalenses is focused inside the focal zone of interest.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Such computers, controllers and data processors may include a non-transitory computer-readable medium with executable instructions. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the term "about" means+/−5% of the stated value.

For the purposes of the present disclosure, lists of two or more elements of the form, for example, "at least one of A, B, and C," is intended to mean (A), (B), (C), (A and B), (A and C), (B and C), or (A, B, and C), and further includes all similar permutations when any other quantity of elements is listed.

What is claimed is:

1. An imaging system, comprising:
a first metalens comprising a plurality of first nanoposts carried by a first substrate;
a first translation stage configured to move the first metalens in a first transverse direction by a first lateral displacement L1;
a second metalens comprising a plurality of second nanoposts carried by a second substrate;
a second translation stage configured to move the second metalens in a second transverse direction by a second lateral displacement L2, wherein the first direction is opposite from the second direction; and
a source of light configured to emit light toward the first metalens and the second metalens,
wherein the first metalens is transversely offset with respect to the second metalens.

2. The system of claim 1, wherein the first lateral displacement L1 and the second lateral displacement L2 equal to a same lateral displacement L.

3. The system of claim 2, wherein light passing through the first and the second metalens is focused at a focal length f expressed as:

$$f(L) = \frac{\pi}{2\lambda AL}$$

where λ is the wavelength of the light, and A is a constant configured for tuning the focal length f.

4. The system of claim 3, wherein a phase shift of the first and the second metalens is expressed as:

$$\theta_{plate}(x, y) = A\left(\frac{1}{3}x^3 + xy^2\right) + B\left(\frac{1}{8}x^4 + \frac{1}{2}xy^3\right)$$

where (x, y) are transverse position coordinates, and wherein B is a constant configured to determine a tunable depth of focus.

5. The system of claim 2, wherein the first metalens is in contact with the second metalens.

6. The system of claim 1, wherein the first nanoposts and the second nanoposts comprise cylindrical shapes.

7. The system of claim 1, wherein the first nanoposts and the second nanoposts comprise silicon nitride.

8. The system of claim 7, wherein the first nanoposts and the second nanoposts are characterized by characteristic diameters d and characteristic height t that are all at nm scale.

9. The system of claim 1, further comprising:
a microscope configured to image a focal zone of the system; and
a photodetector configured to acquire an image of the focal zone.

10. A method for focusing an achromatic beam of light, comprising:
transversely offsetting a first metalens and a second metalens, wherein the first metalens comprises a plurality of first nanoposts carried by a first substrate, and a second metalens comprises a plurality of second nanoposts carried by a second substrate;
after transversely offsetting the first metalens and the second metalens, bringing the first metalens and the second metalens axially in contact;
illuminating the first metalens and the second metalens with a source of light; and
generating a focal area axially away from the first metalens and the second metalens.

11. The method of claim 10, wherein:
transversely offsetting the first metalens and the second metalens is performed by a first translation stage configured to move the first metalens in a first transverse direction by a first lateral displacement L1, and by a second translation stage configured to move the second metalens in a second transverse direction by a second lateral displacement L2, wherein the first direction is opposite from the second direction.

12. The method of claim 11, wherein the first lateral displacement L1 and the second lateral displacement L2 equal to a same lateral displacement L.

13. The method of claim 12, wherein the focal area is located at a focal length f expressed as:

$$f(L) = \frac{\pi}{2\lambda AL}$$

where λ is the wavelength of the light, and A is a constant configured for tuning the focal length f.

14. The method of claim 13, further comprising:
changing a location of the focal area by changing the first lateral displacement L1 and the second lateral displacement L2.

15. The method of claim 13, wherein the light emitted by the source of light is a white light that includes multiple wavelengths, and wherein the focal area comprises at least 37% of all white light that passes through the first metalens and the second metalens.

16. The method of claim 10, further comprising:
acquiring images of the light at the focal area; and
numerically deblurring the images.

17. The method of claim 15, wherein numerically deblurring the images comprises using a function:

$$x = \mathrm{argmin}_x TV(x) + \frac{\mu}{2}\|Kx - y\|_2^2$$

where TV denotes a total variation regularizer, $\mu$ is a tunable hyperparameter for adjusting a weight assigned to deblurring or denoising, and x and y are Transverse coordinates out the focal area.

18. The method of claim 12, wherein the lateral displacement L is within a range of 25 μm to 125 μm.

19. The method of claim 10, wherein the first nanoposts and the second nanoposts comprise silicon nitride.

20. The method of claim 10, wherein the first nanoposts and the second nanoposts have a diameter (d) in a range from 100 nm to 300 nm and a height (t) in a range from 500 nm to 800 nm.

* * * * *